Patented Sept. 17, 1940

2,215,083

UNITED STATES PATENT OFFICE 2,215,083

SULPHONIC ACIDS OF AROMATIC SULPHONIC ACID HALIDES AND PROCESS OF MAKING THE SAME

Walter Mieg and Franz Wieners, Opladen, Germany, assignors to General Aniline & Film Corporation, a corporation of Delaware No Drawing. Application April 26, 1938, Serial No. 204,390. In Germany May 13, 1937

15 Claims. (Cl. 260—505)

We have found that sulphonic acids of aromatic sulphonic acid halides can be obtained by reacting upon aromatic sulphonic acid halides with sulphonation agents and working up the sulphonation products under such conditions as to avoid a saponification of the sulphonic acid halide groups.

As starting materials there come into consideration aromatic sulphonic acid halides, especially the acid chlorides, for instance those of the benzene, naphthalene, anthracene, or phenanthrene series, which may be substituted once or several times by substituents which do not prevent sulphonation. Substituents of this kind are, by way of example, halogen atoms, alkyl, alkoxy, and hydroxy groups. Suitable aromatic sulphonic acid halides are, for instance: o-toluene-sulphonic acid chloride, naphthalene-$\beta$-sulphonic acid chloride, diphenyl-4-sulphonic acid chloride, and 1-acetoxy-naphthalene-5-sulphonic acid chloride.

As sulphonation agents there can be employed concentrated or anhydrous sulphuric acid and sulphuric acid containing sulphuric anhydride. In case concentrated sulphuric acid is employed it must be used in a concentration of at least 66° Bé. as the use of a lower concentrated acid may have a saponifying action upon the acid halide groups.

The sulphonation process can be carried out at a low temperature, for instance 0–30° C., in certain cases, however, higher temperatures are necessary for performing the reaction. At any rate it depends on the starting material what special sulphonation agent is to be employed and whether the reaction can be carried out at a lower temperature or not.

In case of using certain sulphonic acid chlorides as starting materials, for instance naphthalene-$\beta$-sulphonic acid chloride, the sulphonation products separate from the reaction mixture. In these cases the free sulphonic acid can be obtained as such by suction. Otherwise the reaction mixture can be worked up by pouring it into ice-water or a freezing mixture consisting of ice and a salt, for instance sodium chloride or ammonium sulphate, and separating, if necessary, by salting out, for instance, by means of sodium chloride, potassium chloride, lithium chloride, or ammonium sulphate. In this case the corresponding salts of the sulphonic acids of the aromatic sulphonic acid halides are probably obtained. In case of working up by means of ice-water as described above care must be taken that a saponification of the acid halide groups is avoided. Thus as long as the sulphonation products are in contact with water, the temperature must be kept below about 10° C. and the working up must be carried out quickly.

The reaction products obtained are valuable intermediates because the sulphuric acid halide group can be converted in aqueous solution, for instance with compounds which contain hydroxy or amino groups.

Our new products are sulphonic acids of aromatic sulphonic acid halides which depending on the nature of the starting materials used and of the especial reaction conditions employed contain one or several sulphonic acid groups. It is to be understood that the acids themselves as well as the salts are intended to fall into the scope of our present invention.

Due to the presence of sulphonic acid and sulphonic acid halide groups in the same molecule our new compounds represent valuable intermediates as they allow one to react with the same in an aqueous medium upon compounds containing hydroxy or amino groups.

The following examples illustrate the invention without, however, restricting it thereto, the parts being by weight.

Example 1

10 parts of naphthalene-$\beta$-sulphonic acid chloride are introduced at a temperature of about 15–20° C. into 80 parts of fuming sulphuric acid having a content of about 4 per cent of sulphuric anhydride. The reaction mixture is stirred for several hours at about the same temperature. After solution the sulphonation product separate as a thick crystalline mass. The sulphonation product contains apart from the sulphonic acid chloride group in $\beta$-position one sulphonic acid group, probably in the other benzene nucleus.

If the amount of the separation does not increase, either the reaction product as such is filtered by suction, for instance by means of a glass suction filter, or the reaction mixture is stirred up into such a quantity of a freezing mixture as to keep the temperature below 10° C. and the precipitation is sucked off. In order to rinse to neutral reaction a 15 per cent sodium chloride solution may be used.

Example 2

5 parts of o-toluene-sulphonic acid chloride are heated in 20 parts of fuming sulphuric acid having a content of about 40–50 per cent sulphuric anhydride slowly within several hours up to 200° C. and kept at this temperature until a test obtained by pouring several drops of the reaction mixture into an ice-sodium-chloride mixture shows complete solubility in cold water. After cooling the fusion is stirred up into such a quantity of a mixture of ice and ammonium sulphate as to keep the temperature below 10° C.

The sulphonic acid of the o-toluene sulphonic acid chloride which is probably obtained in form of the corresponding ammonium salt can be purified by dissolving it in ice cold water and salting out by means of ammonium sulphate.

Example 3

5 parts of diphenyl-4-sulphonic acid chloride are introduced while cooling into 40 parts of fuming sulphuric acid, having a content of about 4 per cent sulphuric anhydride and stirred several hours at a temperature of 5–10° C., atmospheric moisture being excluded, until a test obtained in an analogous manner as described in Example 2 is soluble in ice cold water. The reaction mixture which may be filtered if desired can be poured into a freezing mixture consisting of ice and ammonium sulphate whereby the sulphonic acid of the diphenyl-4-sulphonic acid chloride separates in a crystallized state. It can be rinsed to neutral reaction on the suction filter with a 30 per cent ammonium sulphate solution.

Example 4

1 part of 1-phenoxy-anthraquinone-6-sulphonic acid chloride (obtainable by causing to react 1-phenoxy-anthraquinone-6-sulphonic acid with phosphorous pentachloride in a solution of nitrobenzene) is heated in 15 parts of sulphuric acid monohydrate for a short time at a temperature of about 30–35° C. The fusion is poured on such a quantity of ice as to keep the temperature below 10° C. and the sulphonation product is salted out. It has the following probable formula

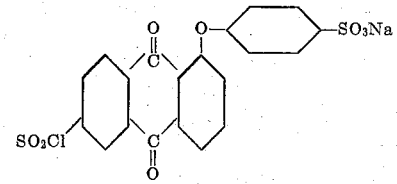

It dissolves in water with a faintly yellowish color.

Example 5

In 350 parts of a 98 per cent sulphuric acid 60 parts of anthracene-β-sulphonic acid chloride are introduced while cooling. The reaction mixture is stirred while continually cooling until a thick crystal mass is obtained. The reaction product obtained can be filtered by suction.

The reaction mixture can also be worked up by dissolving it in such a quantity of ice cold water being necessarily filtered off, if desired, from impurities and salting out the filtrate with solid ammonium sulphate. The sulphonic acid of the sulphonic acid chloride separates in a crystallized state. It contains probably one sulphonic acid group. By increasing the reaction temperature or by using sulphuric acid containing sulphuric anhydride more soluble products are obtained which probably contain several sulphuric acid groups.

Example 6

20 parts of 1-acetoxy-naphthalene-5-sulphonic acid chloride (obtainable by acetylating 1-naphthol-5-sulphonic acid with acetic acid anhydride and causing to react the product obtained with phosphorous pentachloride) are stirred into 90 parts of a 98 per cent sulphuric acid while cooling with ice. Saponification of the acetyl group takes place which can be recognized by the fact that a test portion stirred into water yields a blue coloration with the addition of a solution of iron chloride. Simultaneously sulphonation occurs. As soon as the blue coloration is not increased, 65 parts of sulphuric acid containing 20 per cent of sulphuric anhydride are stirred in while continually cooling and the sulphonation is thus finished.

The fusion is poured on 800 parts of ice and the sulphonic acid of the naphthol sulphonic acid halide obtained salted out by the addition of ammonium sulphate. The precipitation is filtered by suction and rinsed with diluted ammonium sulphate solution. The substance is dried under reduced pressure. It is a colorless water-soluble crystal powder. In case of boiling the aqueous solution an easily soluble naphthol disulphonic acid is obtained the sulphonic acid group being saponified.

We claim:

1. Process for the preparation of sulphonic acids of aromatic sulphonic acid chlorides which comprises reacting upon aromatic carbocyclic sulphonic acid chlorides with a sulphonation agent selected from the group consisting of concentrated and anhydrous sulphuric acid and sulphuric acid containing sulphuric anhydride.

2. Process for the preparation of sulphonic acids of aromatic sulphonic acid chlorides which comprises reacting upon aromatic carbocyclic sulphonic acid chlorides with a sulphonation agent selected from the group consisting of concentrated and anhydrous sulphuric acid and sulphuric acid containing sulfuric anhydride, diluting the reaction mixture and separating the reaction products, care being taken on working up that the temperature does not exceed room temperature.

3. Process for the preparation of sulphonic acids of aromatic sulphonic acid chlorides which comprises reacting upon aromatic carbocyclic sulphonic acid chlorides with a sulphonation agent selected from the group consisting of concentrated and anhydrous sulphuric acid and sulphuric acid containing sulphuric anhydride, pouring the reaction mixture into such a quantity of a freezing mixture as to keep the temperature about 10° C. and separating the reaction products by salting out.

4. Process for the preparation of sulphonic acids of aromatic sulphonic acid chlorides which comprises reacting upon aromatic carbocyclic sulphonic acid chlorides with a sulphonation agent selected from the group consisting of concentrated and anhydrous sulphuric acid and sulphuric acid containing sulphuric anhydride, pouring the reaction mixture into such a quantity of a freezing mixture as to keep the temperature about 10° C. and salting out by means of ammonium sulphate.

5. Process for the preparation of sulphonic acids of aromatic sulphonic acid chlorides which comprises reacting upon naphthalene-β-sulphonic acid chloride with sulphonic acid containing about 4 per cent of sulphuric anhydride.

at a temperature of about 15–20° C. and filtering with suction the reaction product obtained.

6. Process for the preparation of sulphonic acids of aromatic sulphonic acid chlorides which comprises reacting upon naphthalene-β-sulphonic acid chloride with sulphuric acid containing about 4 per cent of sulphuric anhydride at a temperature of about 15–20° C., pouring the reaction mixture in such a quantity of a freezing mixture consisting of ice and sodium chloride as to keep the temperature about 10° C. and filtering with suction the reaction product.

7. Process for the preparation of sulphonic acids of aromatic sulphonic acid chlorides which comprises reacting upon o-toluene-sulphonic acid chloride with sulphuric acid containing about 40–50 per cent of sulphuric anhydride at a temperature of about 200° C. pouring the reaction mixture when cool in such a quantity of a freezing mixture consisting of ice and sodium chloride as to keep the temperature about 10° C. and filtering with suction the reaction product.

8. Aromatic carbocyclic sulphonic acid chlorides which contain sulphonic acid groups.

9. Aromatic carbocyclic sulphonic acid chlorides which contain one sulphonic acid group.

10. Aromatic sulphonic acid chlorides of the benzene series which contain sulphonic acid groups.

11. Aromatic sulphonic acid chlorides of the benzene series which contain one sulphonic acid group.

12. Aromatic sulphonic acid chlorides of the naphthalene series which contain sulphonic acid groups.

13. Aromatic sulphonic acid chlorides of the naphthalene series which contain one sulphonic acid group.

14. Naphthalene-β-sulphonic acid chloride which contains one sulphonic acid group.

15. O-toluene-sulphonic acid chloride which contains one sulphonic acid group.

WALTER MIEG.
FRANZ WIENERS.